(12) United States Patent
Hwang (10) Patent No.: US 7,103,393 B2
(45) Date of Patent: Sep. 5, 2006

(54) SOUND OUTPUT SYSTEM AND METHOD OF A MOBILE COMMUNICATION TERMINAL

(75) Inventor: Seon-Woong Hwang, Suwon-shi (KR)

(73) Assignee: Samsung Electronics Co., Ltd., (KR)

( * ) Notice: Subject to any disclaimer, the term of this patent is extended or adjusted under 35 U.S.C. 154(b) by 526 days.

(21) Appl. No.: 10/331,371

(22) Filed: Dec. 30, 2002

(65) Prior Publication Data
US 2003/0125095 A1    Jul. 3, 2003

(30) Foreign Application Priority Data
Dec. 29, 2001    (KR)    ................ 2001-88388

(51) Int. Cl.
*H04B 1/38*    (2006.01)
(52) U.S. Cl. .................... 455/569.1; 455/550
(58) Field of Classification Search ............. 455/550, 455/556, 569.1, 575.1; 379/433.02; 361/683
See application file for complete search history.

(56) References Cited

U.S. PATENT DOCUMENTS

| | | | |
|---|---|---|---|
| 6,002,949 A * | 12/1999 | Hawker et al. | ........... 455/569.1 |
| 6,359,984 B1 * | 3/2002 | Kim | ............... 379/433.02 |
| 6,470,087 B1 | 10/2002 | Heo et al. | |
| 6,687,120 B1 * | 2/2004 | Hood et al. | ............... 361/683 |
| 6,751,446 B1 | 6/2004 | Kim et al. | |
| 6,819,946 B1 * | 11/2004 | Hansson | ............ 455/569.1 |
| 2002/0042287 A1 * | 4/2002 | Asami | ................ 455/550 |

FOREIGN PATENT DOCUMENTS

| | | |
|---|---|---|
| CN | 1179074 | 4/1998 |
| CN | 1243375 | 2/2000 |
| CN | 1279570 | 1/2001 |

* cited by examiner

*Primary Examiner*—Edward F. Urban
*Assistant Examiner*—Tu X. Nguyen
(74) *Attorney, Agent, or Firm*—Dilworth & Barrese, LLP (57) ABSTRACT

A sound output system and method of a mobile communication terminal, which can output high-fidelity sound even with small-diameter speakers. The sound output system comprises a sound signal reproduction system for reproducing a sound signal to be output by the mobile communication terminal; a plurality of amplifiers, each of which is connected with the sound signal reproduction system and amplifies the sound signal input from the sound signal reproduction system; a plurality of speakers, each of which is connected with each of the amplifiers and outputs the sound signal amplified by each of the amplifiers; and a control section for controlling the sound signal reproduction system, the amplifiers, and the speakers, respectively, according to sound output modes.

13 Claims, 9 Drawing Sheets

FIG.1
(PRIORT ART)

SOUND OUTPUT SYSTEM AND METHOD OF A MOBILE COMMUNICATION TERMINAL

PRIORITY

This application claims priority to an application entitled "Sound Output System And Method Of A Mobile Communication Terminal" filed in the Korean Industrial Property Office on Dec. 29, 2001 and assigned Serial No. 2001-88388, the contents of which are hereby incorporated by reference.

BACKGROUND OF THE INVENTION

1. Field of the Invention

The present invention relates to a sound output system and method of a mobile communication terminal, and more particularly to a system and method for outputting high-fidelity sound in a mobile communication terminal.

2. Description of the Related Art

In general, a sound output system of a mobile communication terminal is used to generate melodic sound or playing music in order to report an incoming call to a user of the mobile communication terminal or reproducing speech sound through the mobile communication terminal. Usually, the sound output system includes a speaker.

Figure 1:
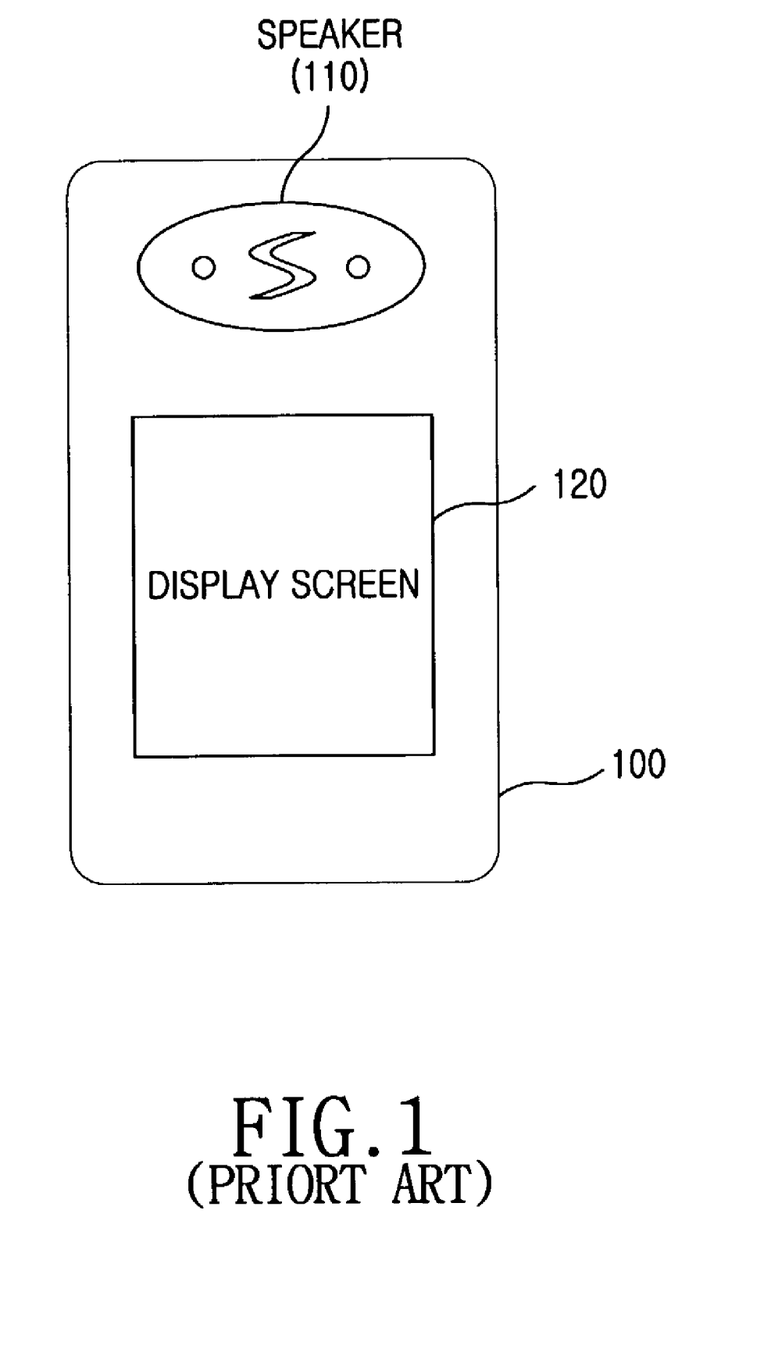
FIG. 1 is a schematic front view of a conventional mobile communication terminal, in which a speaker is disposed.
Figure 2:
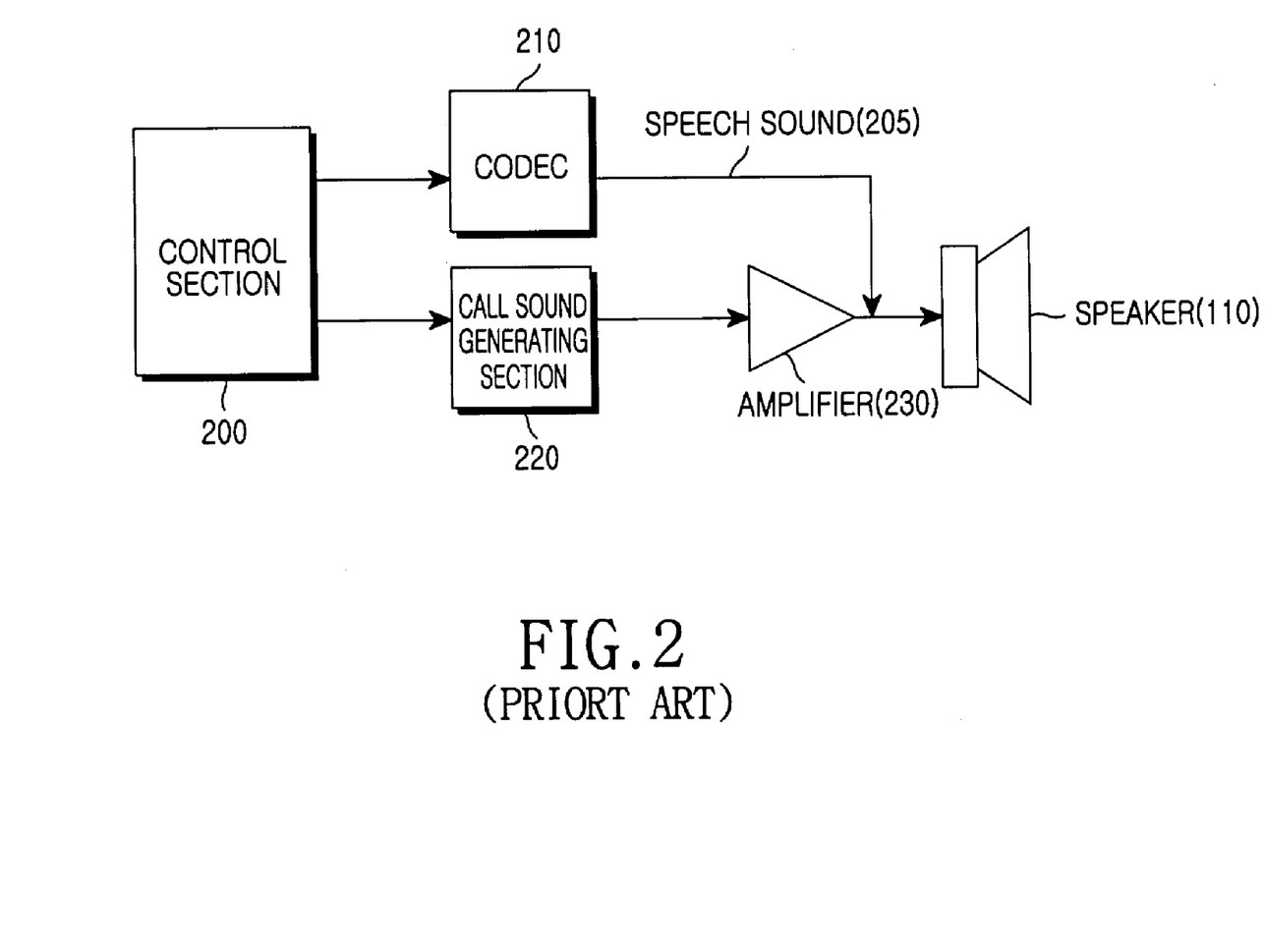
FIG. 2 is a block diagram of a conventional sound output system of a mobile communication terminal.

FIG. 1 is a schematic front view of a conventional mobile communication terminal, on which a speaker is disposed, and FIG. 2 is a block diagram of a conventional sound output system of a mobile communication terminal. A construction and operation of the conventional sound output system of the mobile communication terminal will be described herein below with reference to FIGS. 1 and 2.

Conventionally, a speaker 110 of the conventional sound output system of a mobile communication terminal 100 is disposed together with a display screen 120 on a front surface of the mobile communication terminal 100, as illustrated in FIG. 1. A control section 200 illustrated in FIG. 2 controls a CODEC 210 and a sound generating section 220. The CODEC 210 reproduces and outputs speech sound. The sound generating section 220 reports an incoming call to a user of the mobile communication terminal by generating bell sound, etc. A sound signal such as a speech sound or a bell sound is amplified by an amplifier 230. The speaker 110 outputs the sound signal amplified by the amplifier 230, so that the user can hear the sound.

Recently, mobile communication terminals have differentiated functions, in that they can produce a musical sound or a melodic bell sound in a chord with sixteen or more musical notes as well as a bell sound in a single tone, which can be produced by the conventional mobile communication terminals. In order to produce such chordal sound of a higher class, a mobile communication terminal requires a large-diameter speaker.

Also, as mobile communication terminals 100 incorporate functions of web browsing, etc., the area which a display screen 120 occupies on a surface of the mobile communication terminal 100 increases remarkably in order to realize such functions. As a result, the area which a speaker 110 can occupy on the surface of the mobile communication terminal 100 decreases, making it difficult, if not impossible, to employ a large-diameter speaker capable of producing chordal sound of a higher class. As a result, small-diameter speakers are employed in newer mobile communication terminals, and it is not easy to produce high-fidelity sound or realize sound pressure of a predetermined level in the small-diameter speakers.

SUMMARY OF THE INVENTION

Accordingly, the present invention has designed made to solve the above-mentioned problems occurring in the prior art, and an object of the present invention is to provide a sound output system and method of a mobile communication terminal, which can output high-fidelity sound even with small-diameter speakers.

It is another object of the present invention to provide a sound output system and method of a mobile communication terminal, which can organically control reproduction of speech sound.

In order to accomplish the above and other objects, there is provided a sound output system of a mobile communication terminal, the sound output system comprising: a sound signal reproduction system for reproducing a sound signal to be output by the mobile communication terminal; at least two amplifiers, each of which is connected with the sound signal reproduction system and amplifies the sound signal input from the sound signal reproduction system; at least two speakers, each of which is connected with each of the amplifiers and outputs the sound signal amplified by each of the amplifiers; and a control section for controlling the sound signal reproduction system, the amplifiers, and the speakers.

In accordance with another aspect of the present invention, there is provided a sound output method of a mobile communication terminal including a sound output system comprising at least two amplifiers and at least two speakers connected to the amplifiers, the method comprising the steps of: amplifying a sound signal with the amplifiers when the sound signal is generated; and outputting the sound signal amplified by the amplifiers.

BRIEF DESCRIPTION OF THE DRAWINGS

The above and other objects, features, and advantages of the present invention will be more apparent from the following detailed description when taken in conjunction with the accompanying drawings, in which.

DETAILED DESCRIPTION OF THE PREFERRED EMBODIMENT

Preferred embodiments of the present invention will be described in detail herein below with reference to the accompanying drawings. In the following description of the present invention, a detailed description of known functions and configurations incorporated herein will be omitted when it may make the subject matter of the present invention rather unclear.

The present invention proposes a sound output system of a mobile communication terminal, which includes a plurality of small-diameter speakers, so that the sound output system can output with sufficient volume and high fidelity beyond a limitation of a small-diameter speaker. The sound output system of a mobile communication terminal, which includes a plurality of small-diameter speakers, can be realized by additionally providing at least one speaker and amplifier to an existing system having a single speaker. Moreover, in the sound output system and method according to the present invention, reproduction of speech sound through a mobile terminal can be organically controlled by utilizing a plurality of speakers of the sound output system. Meanwhile, in the following description, a sound output system of a mobile communication terminal having two speakers will be considered as an example, in order to facilitate the description.

In the following preferred embodiments, the mobile communication terminals operate in three basic modes.

1. The Mono Mode

In the mono mode, the mobile communication terminal outputs a sound signal including a speech sound and a melody sound through one amplifier and a speaker connected to the amplifier.

2. The Receiver Mode

In the receiver mode, the mobile communication terminal outputs the sound signal, including only the speech sound, through one amplifier and a speaker connected to the amplifier. The term of receiver indicates a small output that a user will be capable of hearing only with his ear pressed against the mobile communication terminal ear piece, and thus, it a reduce power consumption of the mobile communication terminal.

3. The Stereo Mode

In the stereo mode, the mobile communication terminal divides the sound signal to be output into a plurality of sound signals for reproducing stereo sound, and outputs the divided sound signals through a plurality of amplifiers and speakers, respectively.

Figure 3:
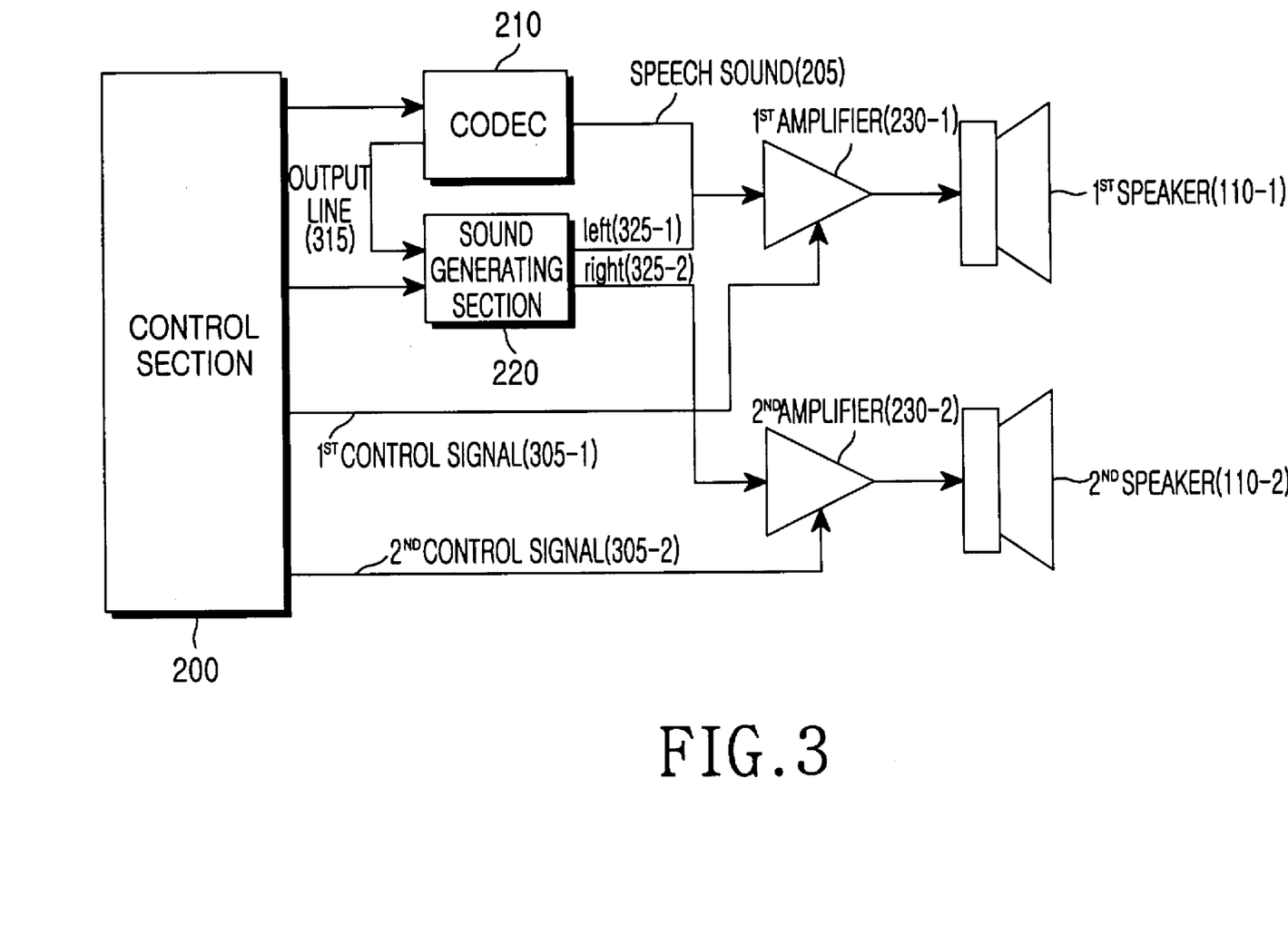
FIG. 3 is a block diagram of a sound output system of a mobile communication terminal according to the present invention, which has two speakers.

FIG. 3 is a block diagram of a sound output system of a mobile communication terminal 100 according to the present invention, which has two speakers. In the sound output system, the control section 200 controls the CODEC 210 and the sound generating section 220. Also, the control section 200 controls operations of the two speakers, that is, first and second speakers 110-1 and 110-2. Control of the first and second speakers 110-1 and 110-2 is carried out by first and second control signals 305-1 and 305-2. The CODEC 210 reproduces and outputs speech sound. The sound generating section 220 reports an incoming call to a user of the mobile communication terminal by generating bell sound, etc. A reproduction system such as a musical instrument digital interface (MIDI) capable of reproducing melody, etc. may be employed as the sound generating section 220. An output signal of the CODEC 210 is input through an output line 315 to the sound generating section 220, and then can be output from the sound generating section 220 to first and second amplifiers 230-1 and 230-2. Hereinafter, the CODEC 210 and the sound generating section 220 together will be called a sound signal reproduction system, except when it is necessary to individually mention each of them. The sound signals output from the sound signal reproduction system, which contain sound such as speech sound or bell sound, are amplified by the first and second amplifiers 230-1 and 230-2. The first and second speakers 110-1 and 110-2 output sound signals amplified by the first and second amplifiers 230-1 and 230-2, respectively, so that a user can hear the sound. The first and second speakers 110-1 and 110-2 consist of a basic speaker for communication and an additional speaker or speakers for both communication and bell sound.

In the meantime, when speakers are packaged, it is most ideal to arrange them symmetrically to each other for producing a sound field effect when the speakers output stereo sound. However, in the case of the mobile communication terminal 100, it is not necessary to simultaneously operate both of the two speakers, since the basic mode of the mobile communication terminal 100 is an earphone mode in communication, in which the user's ear is in contact with one speaker. Therefore, the circuit of the sound output system is so arranged as to allow speech sound to be output through only one speaker. For this arrangement, left and right channels of the circuit must have separate amplifiers and separate controls signals 305-1 and 305-2, respectively.

Hereinafter, the operation of the sound output system according to the present invention will be described in detail with reference to FIG. 3. The following description will be divided according to speech sound 205 and bell sound, respectively.

Speech sound may be output through paths described below. First, speech sound 205 may be output through the sound generating section 220. Speech sound 205 is output through the output line 315 to the sound generating section 220 and then is divided into left and right signals 325-1 and 325-2 by a mixer circuit in the sound generating section 220. The left and right signals 325-1 and 325-2 divided from the speech sound 205 are simultaneously output through the first and second speakers 110-1 and 110-2. Second, speech sound 205 may be output after being divided into the left and right signals 325-1 and 325-2 through a separately arranged mixer circuit without passing through the sound generating section 220. The signals output through the separate mixer circuit are also output through the first and second speakers 110-1 and 110-2. When speech sound 205 is output simultaneously through the first and second speakers 110-1 and 110-2 as it is in the first and second ways described above, a high-level sound pressure can be obtained. As a result, the mobile communication terminal 100 can realize a speakerphone function, which is usually employed in a hand-free apparatus.

Third, speech sound 205 may be output through only one of the first and second speakers 110-1 and 110-2 without passing through the sound generating section 220 nor through a mixer circuit. In this case, speech sound may be amplified through one of the first and second amplifiers 230-1 and 230-2 and then output through one of the first and second speakers 110-1 and 110-2. Otherwise, when the CODEC 210 contains an amplifier, speech sound may be amplified by the amplifier in the CODEC 210 and then output through one of the first and second speakers 110-1 and 110-2. In this case, it is preferred and more effective that the speaker through which speech sound 205 is output has a construction for outputting speech sound 205. When the mobile communication terminal is operated in a receiver mode described above, in which speech sound 205 is output through only one speaker, consumption of electric current can be reduced. Further, since speech sound 205 is output through only one speaker, the volume of the output speech sound is relatively small, so that speech sound can be kept more private.

The bell sound is generated in the sound generating section 220, amplified by the first and second amplifiers 230-1 and 230-2, and then output through the first and second speakers 110-1 and 110-2. Usually, the bell sound generated in the sound generating section 220 is a stereo sound including left and right signals, which can be differentiated from each other.

That is, the bell sound can be stereophonically output through the first and second speakers 110-1 and 110-2, and it can be monophonically output through one speaker as well, output through a loudspeaker in a conventional mobile communication terminal.

In order to enable the stereophonic output of the bell sound, the sound generating section 220 divides the sound signal into the left and right signals 325-1 and 325-2 and then outputs them. The left and right signals 325-1 and 325-2 output from the sound generating section 220 are amplified by the first and second amplifiers 230-1 and 230-2. The two amplified signals are stereophonically output through the first and second speakers 110-1 and 110-2.

In the mobile communication terminal 100 supporting the stereophonic output as described above, speech sound 205 also can be stereophonically output in the way in which the bell sound is stereophonically output.

Hereinafter, arrangements of elements of a sound output system according to the present invention in the mobile communication terminal 100 will be described with reference to the accompanying drawings.

Figure 4A:
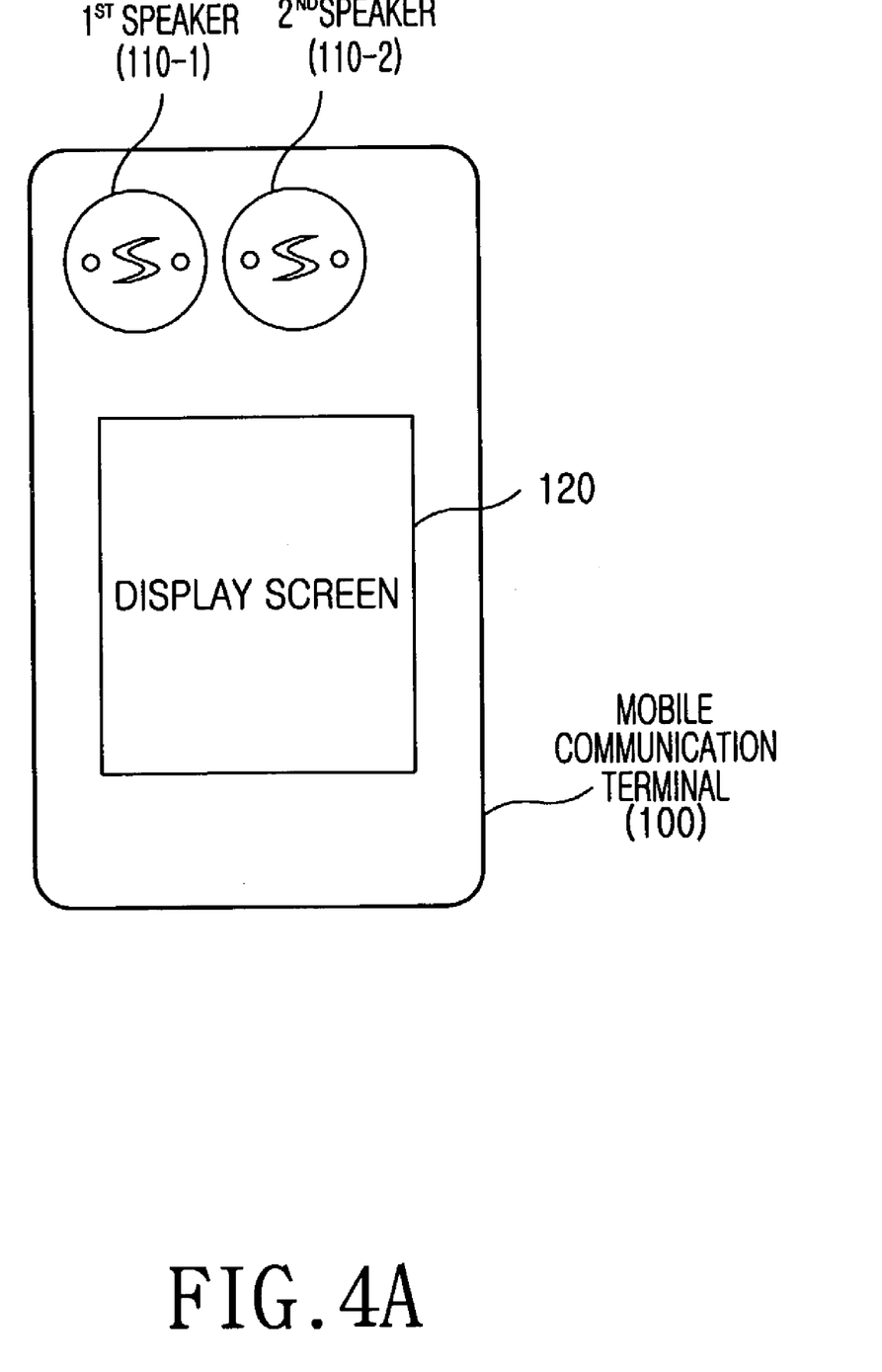
FIG. 4A is a front view of a mobile communication terminal, in which one of a plurality of speakers constituting the sound output system according to the present invention is disposed at a central upper end portion of a front surface of the mobile communication terminal.
Figure 4B:
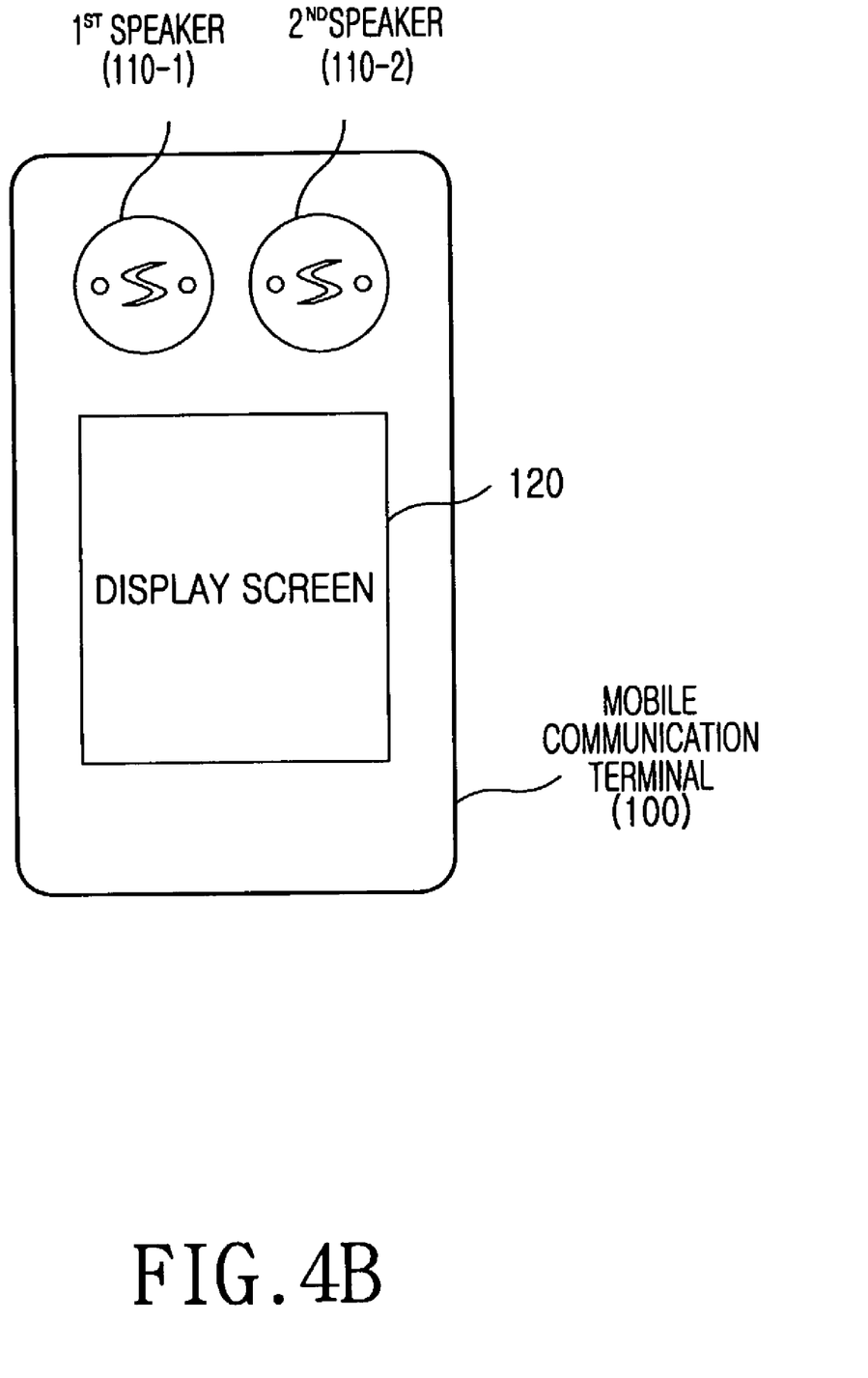
FIG. 4B is a front view of a mobile communication terminal, in which two speakers constituting the sound output system according to the present invention are symmetrically disposed at left and right portions of an upper end of a front surface of the mobile communication terminal.

FIG. 4A is a front view of a mobile communication terminal, in which one of speakers constituting the sound output system according to the present invention is disposed at a central upper end portion of a front surface of the mobile communication terminal. FIG. 4B is a front view of a mobile communication terminal, in which two speakers constituting the sound output system according to the present invention are symmetrically disposed at left and right portions of an upper end of a front surface of the mobile communication terminal. Especially as illustrated in FIG. 4A, the speaker disposed at the central upper end portion of the mobile communication terminal 100 can be utilized as a speaker for speech sound. Of course, this is only one embodiment of the sound output system according to the present invention, but does not restrict the scope of the present invention.

Figure 5A:
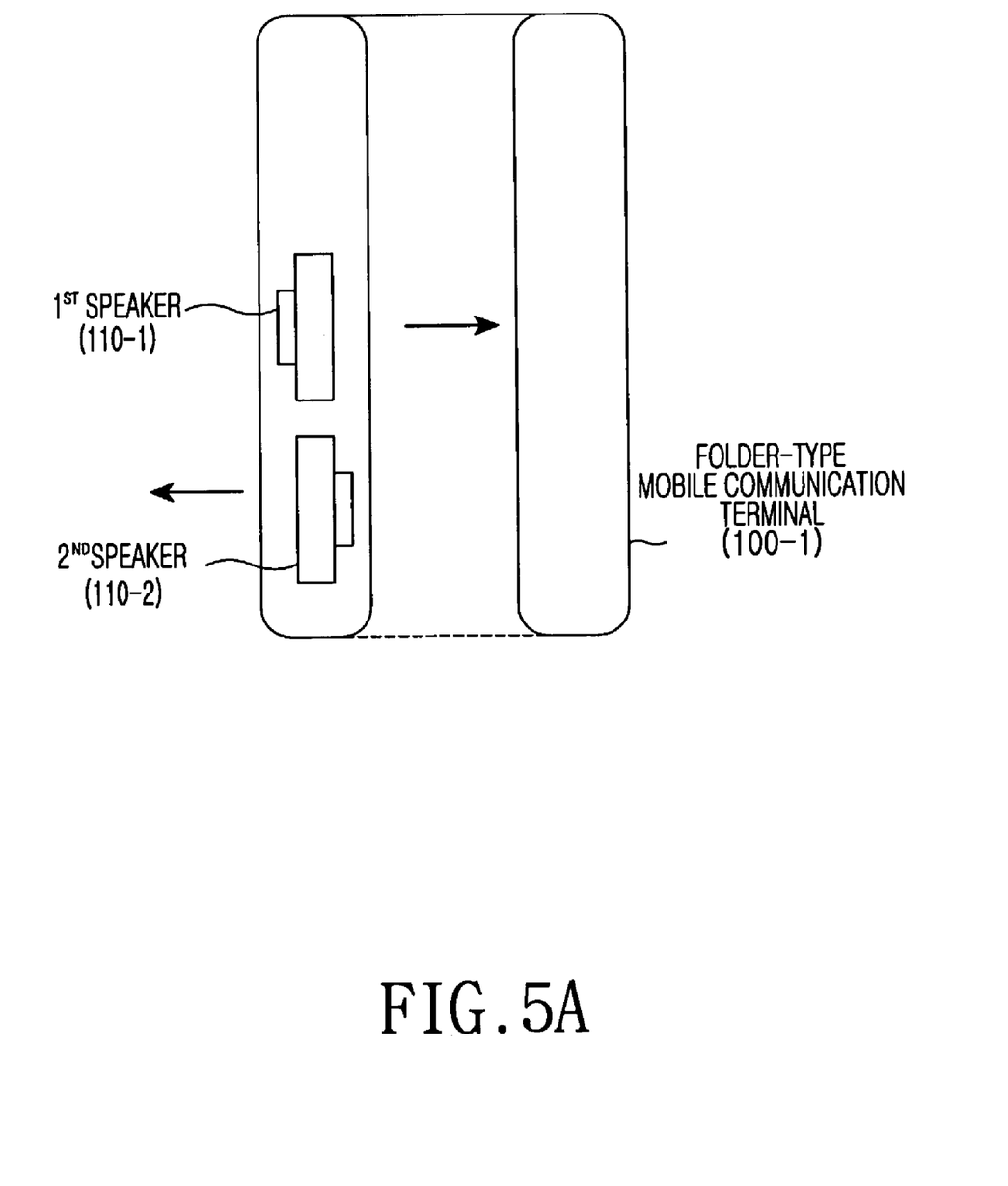
FIGS. 5A and 5B are side views of folder-type mobile communication terminals illustrating arrangements of speakers constituting a sound output system according to the present invention in the folder-type mobile communication terminals.
Figure 5B:
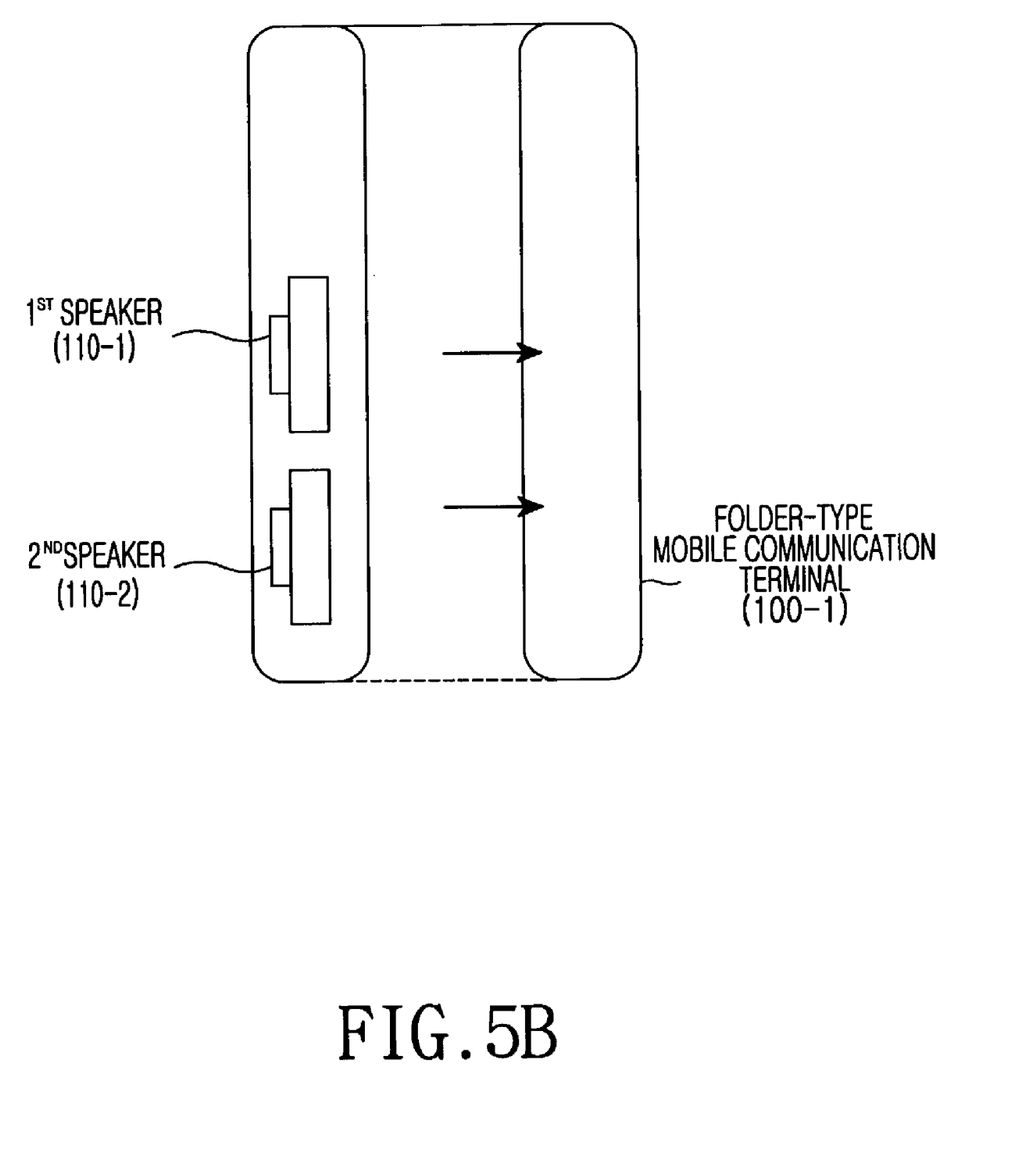

FIGS. 5A and 5B are side views of folder-type mobile communication terminals illustrating arrangements of speakers constituting a sound output system according to the present invention in the folder-type mobile communication terminals. In the folder-type mobile communication terminal 100-1 illustrated in FIG. 5A, the first speaker 110-1 is disposed inward of the folder while the second speaker 110-2 is disposed outward of the folder. This construction is made in consideration of when the folder is closed in the folder-type mobile communication terminal. That is, the arrangement illustrated in FIG. 5A is especially useful in a folder-type mobile communication terminal, in which the interior of the folder is not exposed when the folder is closed. As described above, in the folder-type mobile communication terminal 100-1, the speaker or speakers oriented outward of the folder can improve the reproduction of sound when the folder is closed. That is, sounds such as the bell sound can be made louder through the speaker or speakers oriented outward of the folder. This orientation of the speakers is a construction, which values much of the state where the folder is closed. In this case, a speaker for speech sound is usually oriented inward of the folder. Further, when the folder is closed, power consumption of the folder-type mobile communication terminal 100-1 can be reduced by controlling the speaker oriented inward of the folder not to be operated. It goes without saying that all of the speakers 110-1 and 110-2 can be oriented in the same direction as illustrated in FIG. 5B in the folder-type mobile communication terminal 100-1 also. When the two speakers are disposed in parallel, that is, oriented in the same direction, the sound pressure can be maximized in the folder-type mobile communication terminal 100-1 also. Further, stereo sound can be output through the two speakers disposed in parallel.

When the speakers constituting the sound output system of the mobile communication terminal 100 are installed, attention must be paid to the fact that pressure and quality of sound can be influenced by the phase of the output sound when the speakers are disposed in parallel at adjacent locations. Therefore, the sound signals output through the speakers must have the same phase. Also, it is preferred that the speaker located at the central portion of the mobile communication terminal 100 has functions of either an earphone or a speaker, thereby reproducing either speech sound or the bell sound.

Figure 6A:
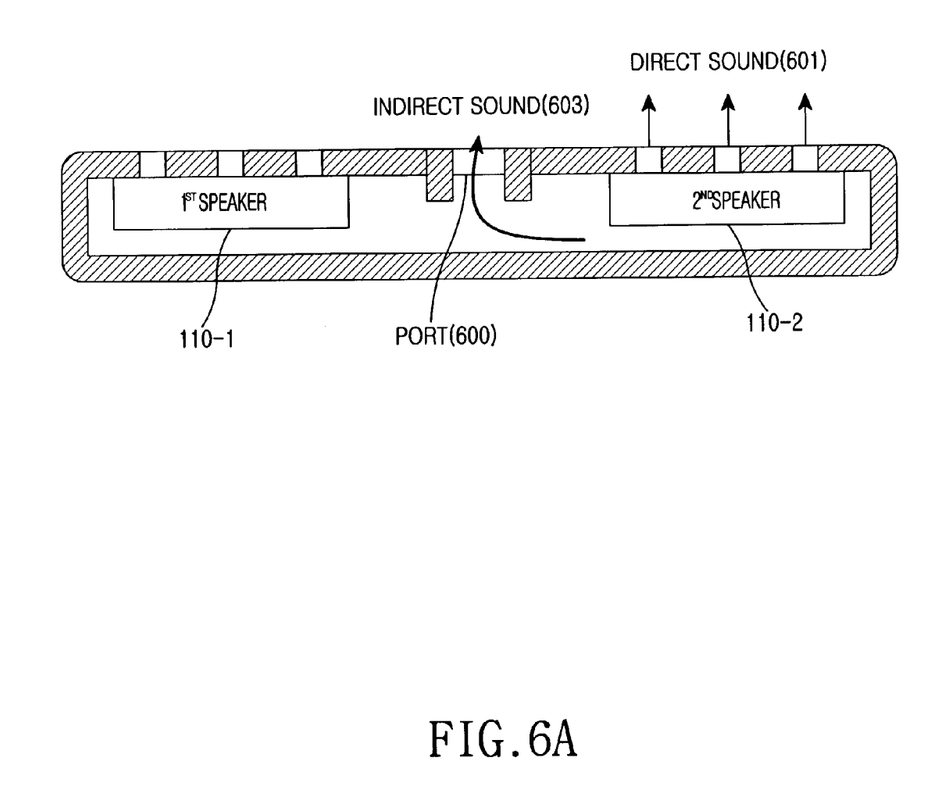
FIGS. 6A and 6B are views illustrating the constructions for packaging speakers in the mobile communication terminal.
Figure 6B:
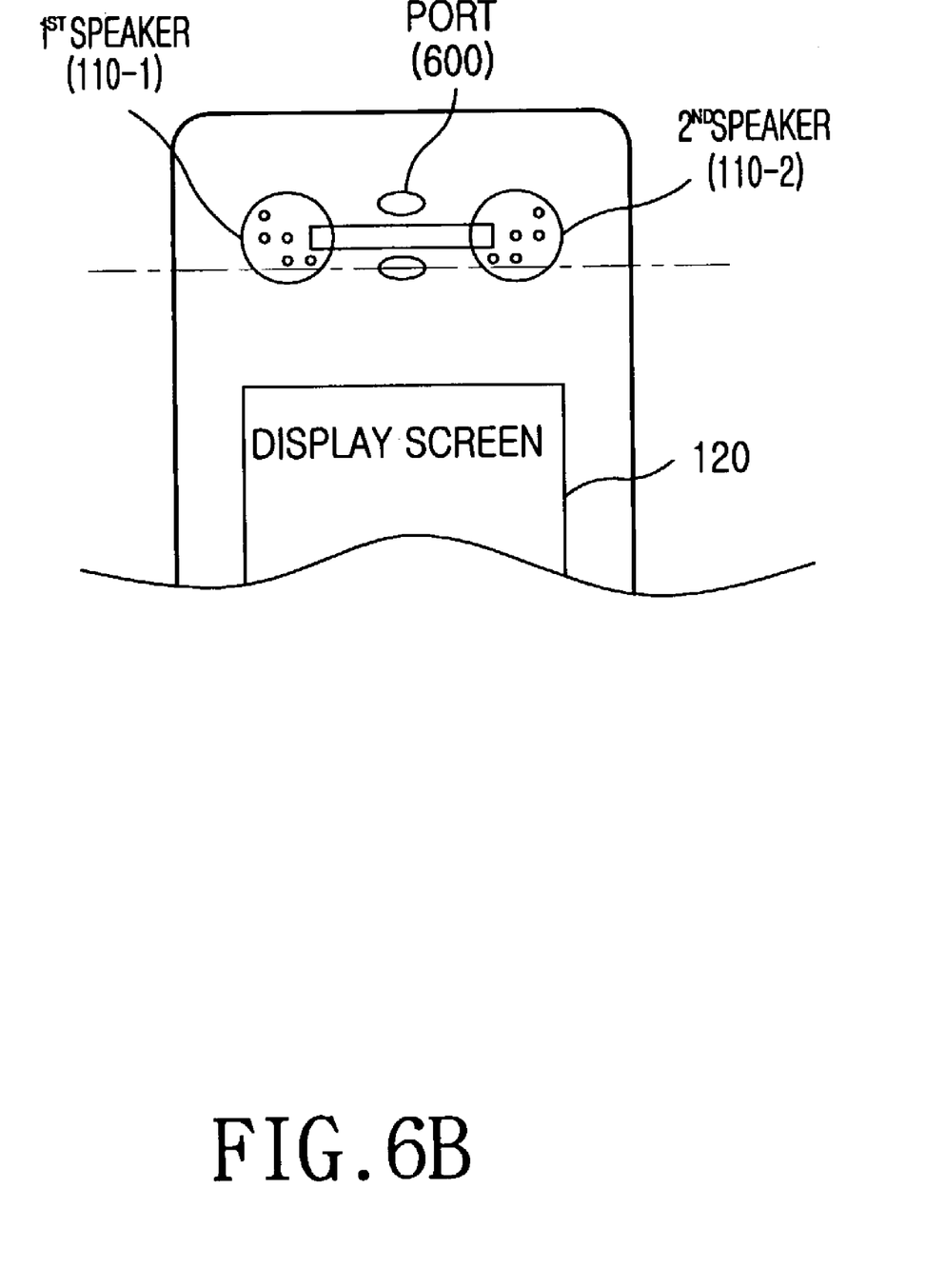

FIGS. 6A and 6B are views showing the constructions for packaging speakers in the mobile communication terminal. FIGS. 6A and 6B do not show an output of direct sound through the first and second speakers 110-1 and 110-2, but instead show an output of indirect sound. That is to say, as illustrated in FIGS. 6A and 6B, a port 600 is formed through a portion of the mobile communication terminal 100 between the first and second speakers 110-1 and 110-2, so that not only direct sound 601 can be output through the first and second speakers 110-1 and 110-2 but also indirect sound 603, which is reflected sound, can be output through the port 600.

The output of the indirect sound 603 may be effective when the speakers are packaged in the arrangement illustrated in FIG. 4B. In the arrangement illustrated in FIG. 4B, since a user of the mobile communication terminal 100 cannot hear the direct sound 601 of the first speaker 110-1 or the second speaker 110-2 at the central position, the user must locate his or her ear to be in contact with one of the first and second speakers 110-1 and 110-2. In order to overcome this shortcoming, the port 600 of base reflex type is formed through a central portion between the speakers, which is located at an earphone socket, so that the indirect sound 603, which is softer and has more undertone than the direct sound 601 can be output through the port 600. It is beyond question that the indirect sound 603 can also be output in the folder-type mobile communication terminal 100-1.

When a user of the mobile communication terminal 100 makes a communication with the mobile communication terminal 100 in his or her left hand, the output of speech sound is naturally biased to the right speaker. Therefore, there may be considered an embodiment of the present invention in which the speaker for speech sound is disposed at the right channel of the circuit. Of course, in consideration of the opposite case where a user of the mobile communication terminal 100 makes a communication with the mobile communication terminal 100 in his or her right hand, there may be considered another embodiment of the present invention in which the speaker for speech sound is constructed at the left channel of the circuit.

Although the above description of the present invention is given for a sound output system of a mobile communication terminal having two speakers, it is only one embodiment for facilitating the description, and a sound output system having more than two speakers may be easily realized by the present invention. Further, although the above description is given about a sound output system having small-diameter speakers, it is apparent to those related in the art that the present invention includes a sound output system having not small- but large-diameter speakers.

A mobile communication terminal having a sound output system according to the present invention can output sound with high fidelity and sufficient volume even through small-diameter speakers. Also, this mobile communication terminal can reproduce stereo sound.

Moreover, this mobile communication terminal has a function of a speakerphone and can replace a hands-free apparatus by outputting sound with sufficient volume.

While the invention has been illustrated and described with reference to certain preferred embodiments thereof, it will be understood by those skilled in the art that various changes in form and details may be made therein without departing from the spirit and scope of the invention as defined by the appended claims.

What is claimed is:

1. A sound output system of a mobile communication terminal, the sound output system comprising:
    a sound signal reproduction system for reproducing a sound signal to be output by the mobile communication terminal;
    a plurality of amplifiers, each of which is connected with the sound signal reproduction system and amplifies the sound signal input from the sound signal reproduction system;
    a plurality of speakers equal in number to the plurality of amplifiers, each of which is connected with only one amplifier, and output the sound signal amplified by its connected amplifier, wherein the mobile communication terminal includes a port formed through a portion of the mobile communication terminal between the speakers, enabling indirect sound to be output through the port; and
    a control section for controlling the sound signal reproduction system, the amplifiers, and the speakers, respectively, according to sound output modes.

2. The sound output system of claim 1, wherein the sound signal reproduction system comprises a CODEC for processing a speech sound and a sound generating section for processing a melody sound.

3. The sound output system of claim 1, wherein when the sound output mode is a stereo mode, the sound signal reproduction system divides the sound signal to be output into a plurality of sound signals and outputs the divided sound signals through the plurality of amplifiers, respectively, thereby reproducing stereo sound.

4. The sound output system of claim 1, wherein when the sound output mode is a mono mode, the sound signal reproduction system outputs the sound signal including a speech sound and a melody sound through one of the amplifiers and a speaker connected to the amplifier.

5. The sound output system of claim 1, wherein when the sound output mode is a receiver mode, the sound signal reproduction system outputs the sound signal including only a speech sound through one of the amplifiers and the speaker connected to the amplifier.

6. The sound output system of claim 1, wherein amplifiers and speakers, among the plurality of amplifiers and speakers, through which the sound signal is not output, are disabled by the control section.

7. The sound output system of claim 1, wherein the plurality of speakers consist of at least one speaker provided to face an inner surface of a folder of the mobile communication terminal and at least one second speaker provided to face an outer surface of the folder.

8. The sound output system of claim 1, wherein the plurality of speakers are oriented in an identical direction.

9. The sound output system of claim 7, wherein only the amplifier corresponding to the at least one second speaker is operated by the control section when the folder is closed.

10. A sound output method of a mobile communication terminal including a sound output system comprising a plurality of amplifiers and an equal plurality of speakers each connected to one and only one of the amplifiers, the method comprising the steps of:
    determining sound output modes according to a sound signal output; when the determined sound output mode is a mono mode, outputting a sound signal to only one of the plurality of amplifiers;
    when the determined sound output mode is a stereo mode, dividing a sound signal to be output into a plurality of sound signals for reproducing stereo sound and outputting the divided sound signals through a plurality of amplifiers, respectively; and
    outputting the amplified sound signals through corresponding speakers indirectly through a port formed though a portion of the mobile communication terminal between the speakers.

11. The sound output method of claim 10, wherein the output sound signal includes at least one of a speech sound and a melody sound.

12. The sound output method of claim 11, wherein the speech sound is output through one of the plurality of amplifiers and the corresponding speaker, when the determined sound output mode is a receiver mode.

13. A sound output system of a folder-type mobile communication terminal, the sound output system comprising:
    a sound signal reproduction system for reproducing a sound signal to be output by the mobile communication terminal;
    a plurality of amplifiers, each of which is connected with the sound signal reproduction system and amplifies the sound signal input from the sound signal reproduction system;
    an equal plurality of speakers, each of which is connected with one and only one of the amplifiers and outputs the sound signal amplified by the corresponding amplifier, wherein the mobile communication terminal includes a port formed through a portion of the mobile communication terminal between the speakers, enabling indirect sound to be output through the port; and
    a control section for determining whether a sound output mode is a mono output mode or a stereo output mode when the sound signal is generated, and then, if the determined sound output mode is a mono output mode, outputting the sound signal through only one of the plurality of amplifiers, and if the determined sound output mode is a stereo output mode, dividing the sound signal to be output into a plurality of sound signals for reproducing stereo sound and outputting the divided sound signals through a plurality of amplifiers, respectively.

* * * * *